Aug. 6, 1940.      H. M. FARRAND      2,210,619
TURN SIGNALING MEANS FOR VEHICLES
Filed Sept. 16, 1937      5 Sheets-Sheet 1
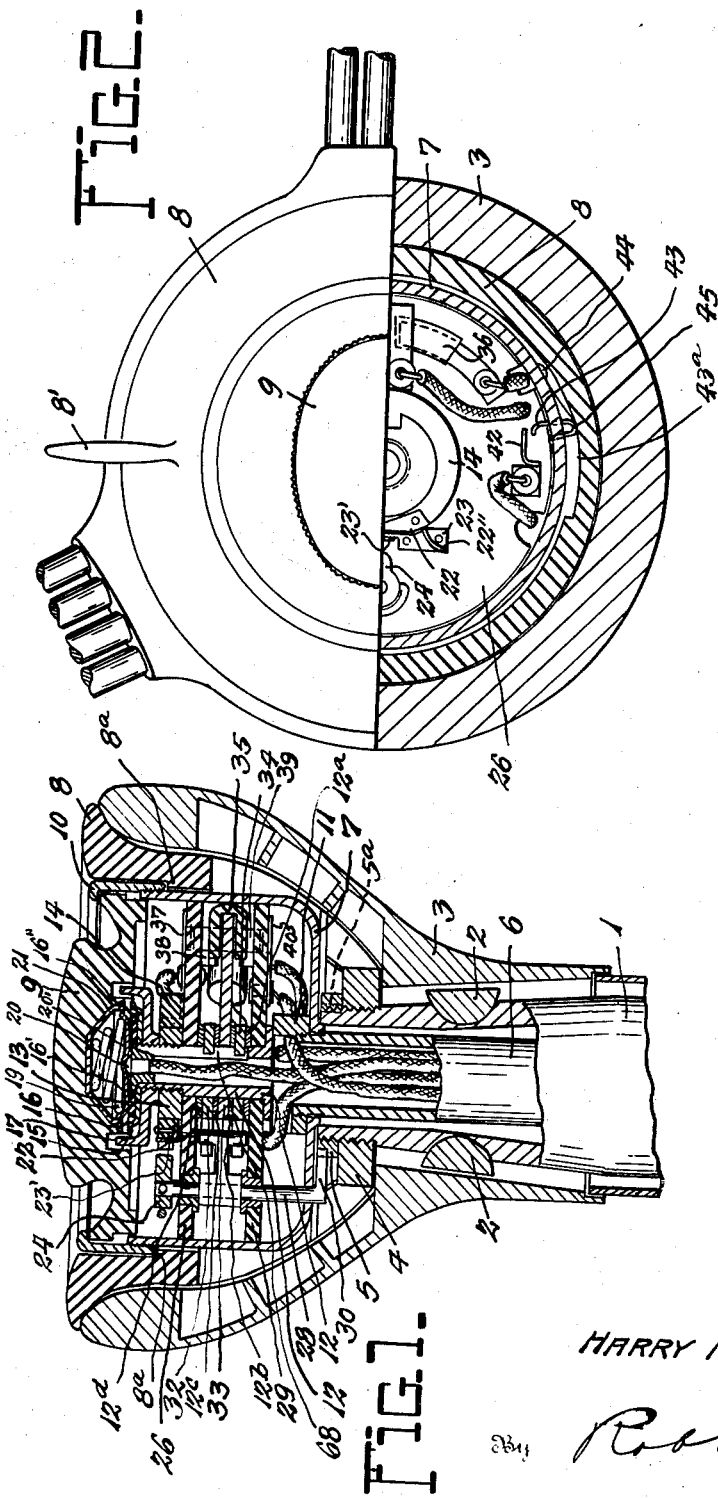
Inventor
HARRY M. FARRAND.
By Robert Cobb
Attorneys

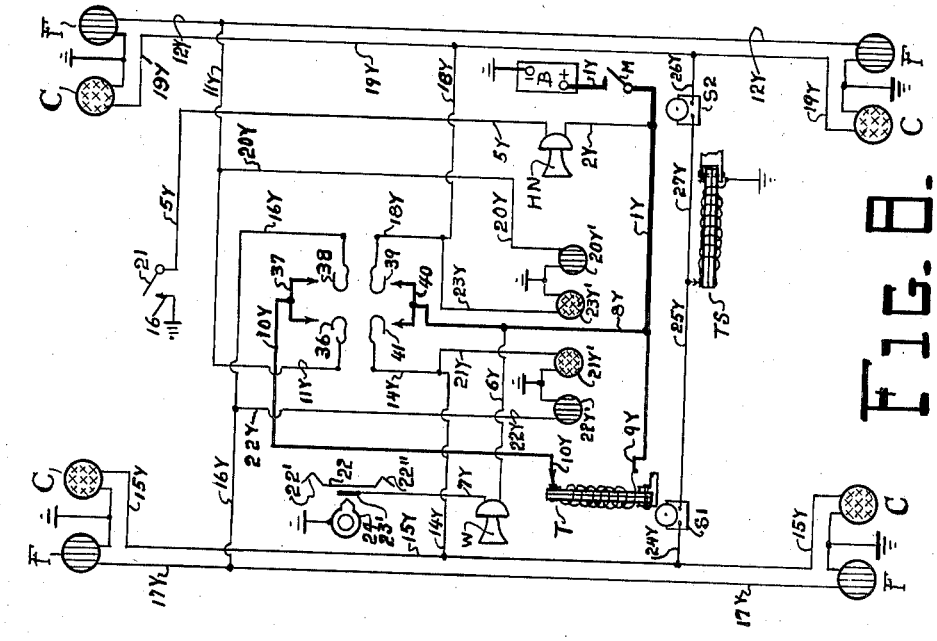
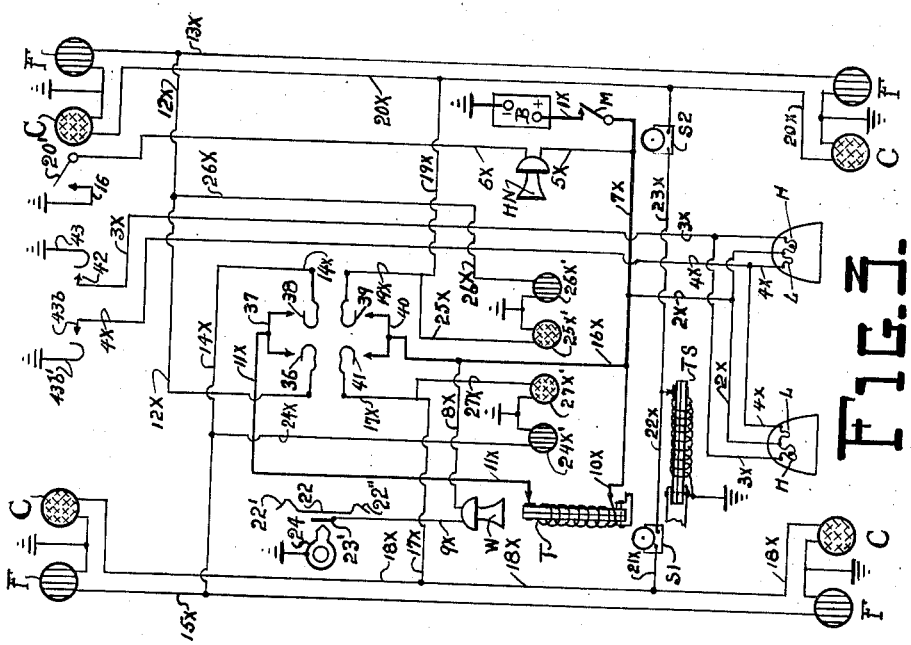

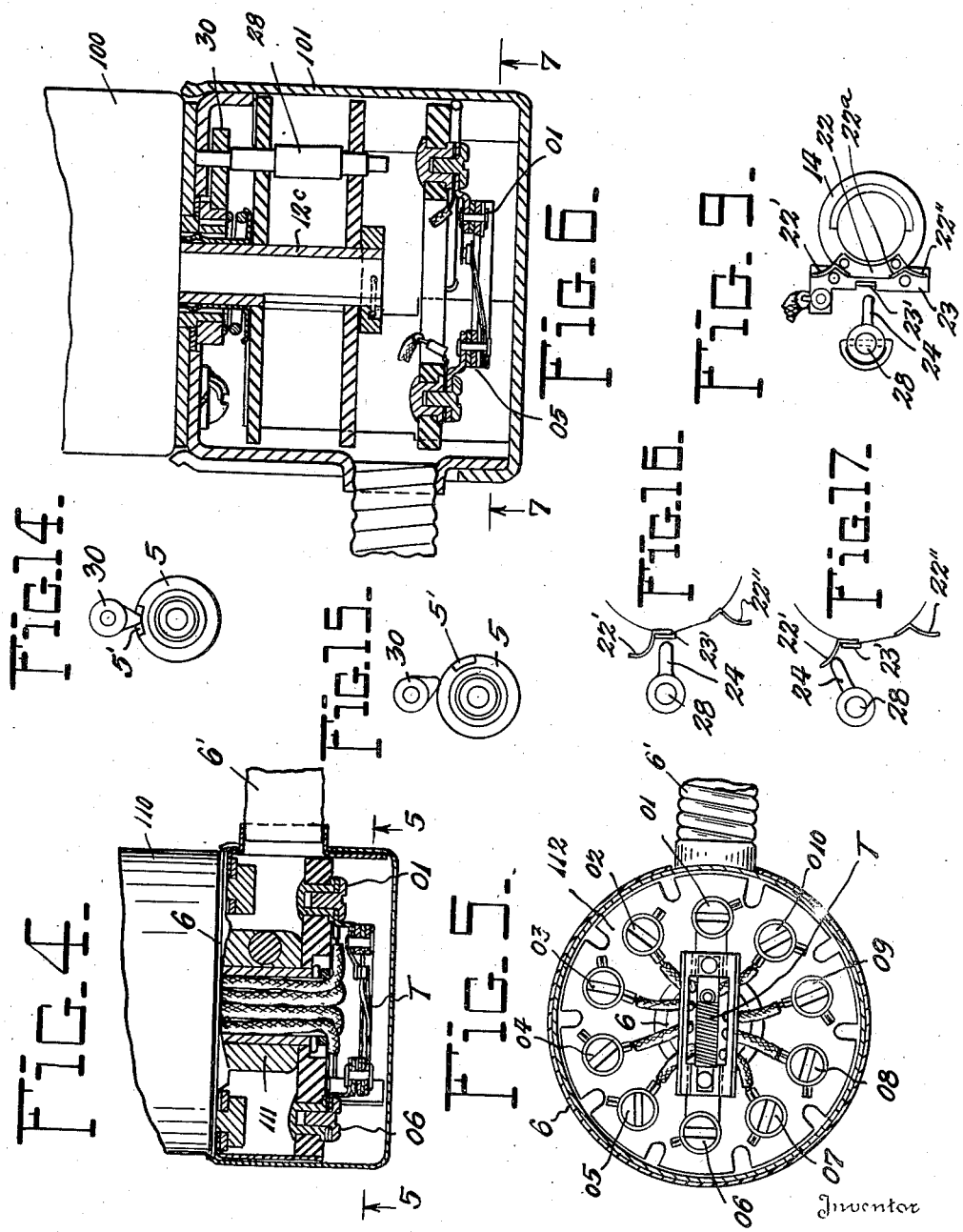

Aug. 6, 1940.  H. M. FARRAND  2,210,619
TURN SIGNALING MEANS FOR VEHICLES
Filed Sept. 16, 1937   5 Sheets-Sheet 4
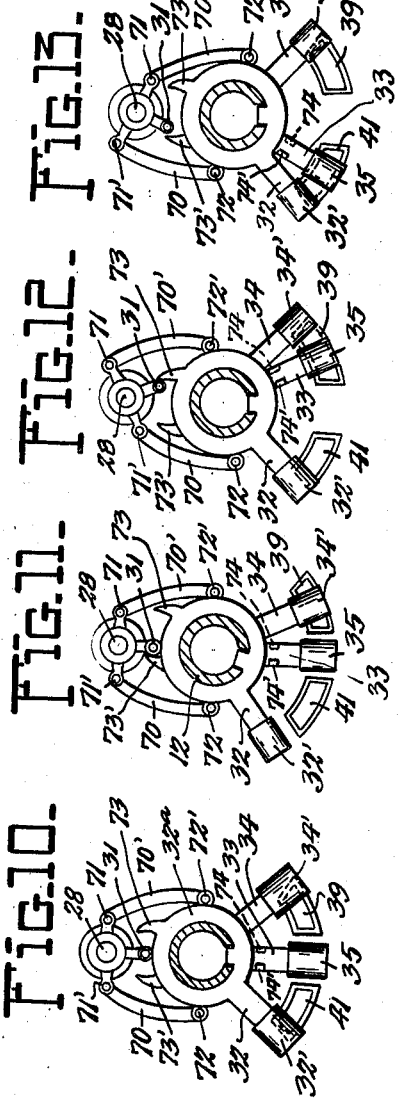
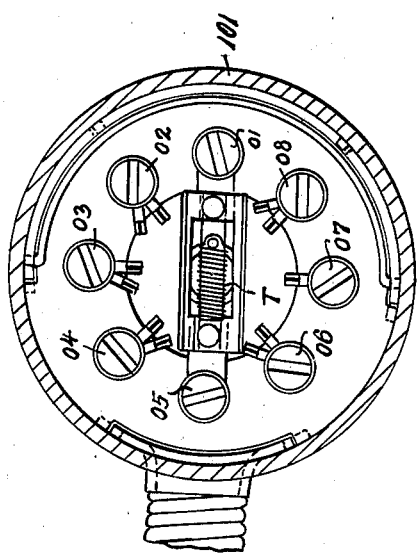
Inventor
HARRY M. FARRAND.
By Robb & Robb
Attorneys Aug. 6, 1940.   H. M. FARRAND   2,210,619
TURN SIGNALING MEANS FOR VEHICLES
Filed Sept. 16, 1937   5 Sheets-Sheet 5
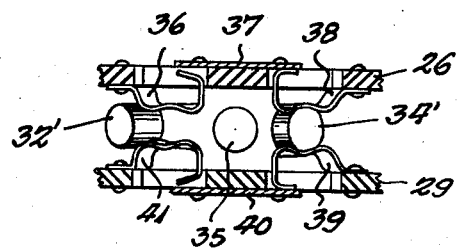
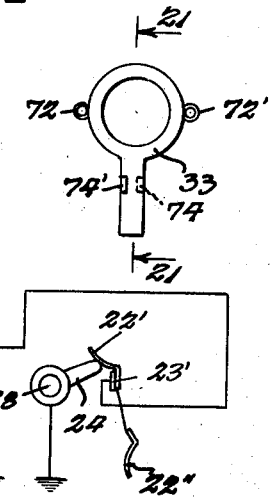
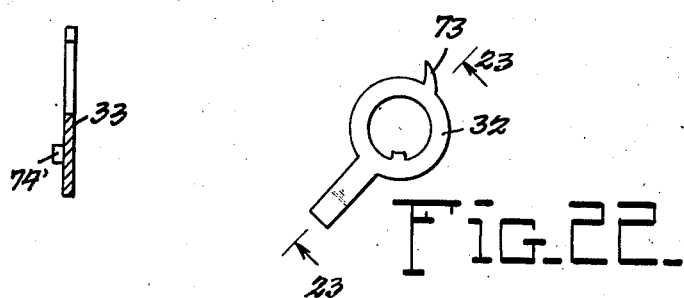
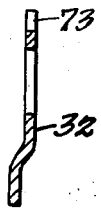
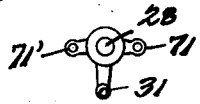
Inventor
HARRY M. FARRAND.
By Robb & Robb
Attorneys Patented Aug. 6, 1940

2,210,619

UNITED STATES PATENT OFFICE 2,210,619

TURN SIGNALING MEANS FOR VEHICLES

Harry M. Farrand, Cleveland, Ohio

Application September 16, 1937, Serial No. 164,221

8 Claims. (Cl. 177—339)

My invention embodies novel improvements in the type of signaling apparatus or mechanism designed for use upon automobiles or other conveyances, the steering or turning operations of which are controlled by a steering wheel or shaft structure of some kind.

In the carrying out of my invention a large number of novel objectives are achieved by the special design of mechanism employed.

A primary feature of this invention resides in the employment of a vehicle turn signaling means in which the main operating or control parts are embodied in a self-contained unit, said parts enabling the setting of turn and caution visible signals simultaneously with the sounding of audible signals and the automatic turning off of the signals at the completion of the vehicle turning operation. The visible signals contemplated for use with the invention may have different characteristics, those on the side toward which the turn is made flashing rapidly while other caution signals at the opposite side of the vehicle may be steady burning lights, or lights of different characteristic action than the flashing signals. Likewise the audible signaling means associated with the visible signaling means of the invention is designed to have different characteristics, as for instance by providing instrumentalities to give a single pleasing musical note or sound when a left turn of the vehicle is being made, which sound may be doubled or a repeated note or notes for the right turn audible indication.

Another feature of the invention is the provision upon the instrument panel of the vehicle, for direct visibility with respect to the driver, of tell-tale lights that work in conjunction with the turning signal means for indicating to the driver the action of his signaling controls and operations.

Still another main and important object of the invention has been to produce a control and operating unit containing the main control and operating parts for the signaling means, which unit comprises a compact assembly of such parts of a size that it may be installed by a car manufacturer as a structural part of the steering device, preferably enclosed within the hub of the steering wheel itself without requiring any enlargement or material departure from present manufactured constructions or types of such wheels. When so incorporated in the steering wheel structure of the vehicle steering apparatus, the operating and controlling mechanism may be installed, with the headlight and dimmer switches, and horn button included. Thus the entire unit comprising the combination of automatic and manually operated turn signal mechanism and the horn button is susceptible of being displaced without disturbing any other parts of the steering wheel or steering column structure, as by the simple removal of a suitably used keeper or retaining ring. Also it is contemplated in respect to the controlling mechanism aforesaid that if desired this mechanism may be installed in a small box or casing conforming somewhat in size and shape to the steering gear housing and readily attachable to the latter at the lower end of the steering column, if such an arrangement thereof is desired, in lieu of the installation of said unit in the steering wheel hub structure.

Referring more specifically to important objects of the invention, a special object thereof has been to provide vehicle directional turn signal mechanisms adapted to be operated automatically, or manually, used separately or in combination, the mechanism of each type, namely automatic or manual, being complete within itself, but the two mechanisms being so interlocked as to permit of their working together or independently, as may be required or desired in the operation thereof.

Another objective achieved by this invention has been a provision of signal means for warning following or approaching vehicles or conveyances, and pedestrians, that a signaling automobile equipped with the automatic and manual operating turn signals of the invention is making a turn contrary to that for which a manual signal may have been pre-set or operated. In line with this objective, the special warning signal mentioned, hereinafter called a wrong turn signal member, is characterized by an audible sound quite distinctive from that used in the ordinary car turn signaling operations of the vehicle signal mechanism, so that both the driver of the vehicle, and also pedestrians and drivers of oncoming vehicles will surely be warned of the unusual condition that the vehicle is about to be turned in a direction other than the one indicated by the manually pre-set signaling device.

A special object of the invention has been to provide means to automatically correct the operation of the manually pre-set signal, set for a turn, by automatically shifting the signal to the turn as actually made, at the same time sounding a warning signal of an audible nature to all concerned respecting the danger involved, thereby to avoid possible accidents.

A further object of the invention has been to provide instrumentalities for automatically locking the manually operated portion of the mechanism during the operation of the automatic portion so as to avoid possibility of accident incident to an attempted deliberate manual setting of conflicting signals.

Another object of the invention has been to devise a compact and self-contained combination automatic and manually controlled turn signal unit, headlight and dimmer switch, and horn button, small enough to be installed in the hub of an ordinary steering wheel such as used today, or of a similar unit nature small and compact and capable of being installed at the lower end of a steering column associated with or attached to the steering gear housing at such end.

Included in the invention are many other objectives, so far as the details of construction, mode of assemblage, convenient access to and operation of parts, and desirable circuit arrangements used, are concerned. These more or less detail features will be presented and understood upon reference to the following description in conjunction with the annexed drawings, in which—

Figure 1 is a vertical sectional view taken through the hub portion of a steering wheel, showing a portion of the steering column and illustrating the adaptation of the invention wherein the main control and operating parts of the signaling mechanism are assembled largely within the steering wheel hub structure.

Figure 2 is a top plan view in part and part sectional view of the hub portion of a steering wheel embodying the invention, certain of the spokes of the wheel being partially illustrated by being broken away short distances from the hub structure.

Figure 3 is a diagram of the electric circuit arrangements employed in conjunction with the adaptation of the invention illustrated by Figures 1 and 2, the circuit arrangements including the general electric system of an automobile or like vehicle, certain parts being omitted.

Figure 4 shows the terminal box and structural parts therein contained, the same being fixedly attached to the steering gear housing at the lower end of the steering column located in the engine compartment, the terminal box being illustrated in section along with the contained parts.

Figure 5 is a sectional view taken about on the line 5—5 of Figure 4, looking in the direction of the arrows.

Figure 6 is a sectional view wherein certain parts are designed as a modification of the invention suitable to be used when the main controlling and operating parts of the signaling mechanism, many of which are shown in Figure 1, may be assembled in the compartment space shown in this figure. The general arrangement of the parts that will be used and which are shown in Figure 1, while not illustrated, will be understood upon reference to the following description.

Figure 7 is a sectional view taken on the line 7—7 of Figure 6, looking in the direction of the arrows.

Figure 8 is a diagram similar to Figure 3, showing the modified arrangement of the parts, including the general electric system of an automobile, when the main control and operating parts of the signaling mechanism are assembled in a structure such as shown in Figure 6 instead of employing the assembly illustrated in Figures 1 and 2 and other figures to be hereinafter referred to, certain parts of the electric system being omitted.

Figure 9 is a detail view illustrating certain features of the wrong turn signal switch devices.

Figure 10 is a horizontal sectional view through the control and operating mechanism assembled in the hub structure of the steering wheel, showing certain manual and automatic operating features in a normal or neutral position.

Figure 11 is a view like Figure 10 but illustrating the positions assumed by the parts when the manual control means is pre-set for a right turn signaling for the vehicle.

Figure 12 is a view similar to Figure 11, showing the manner in which the automatic signal roller arm operates to move the pre-set manual roller arm to restore the latter to normal or neutral position when the automatically operated roller arm is shifted by the turning of the steering wheel as the vehicle makes the turn signaled by the pre-set manual means.

Figure 13 is a view similar to Figure 12 but illustrating the position of the manual and automatically operated roller arms in an exemplification of the action of the invention when a manual roller arm has been adjusted (as seen in Figure 12) to give a direction of turning and the turn is made in the opposite direction, causing the automatic roller arm to engage the opposite turn signal instrumentalities, thereby operating the wrong turn signal because the driver of the vehicle does not turn in the direction for which he pre-set the manual means.

Figure 14 is a small illustration of the automatically operating cam which is mounted upon the steering tube and actuates the toe cam by which the automatic roller arm is shifted in one direction or another, dependent upon the direction of turning the steering wheel.

Figure 15 is a view like Figure 14, but showing the parts in the position assumed thereby when the steering wheel is turned to the right.

Figure 16 is a fragmentary view showing certain parts of the wrong signal device illustrated in Figure 9 conditioned preliminary to giving the wrong signal indication, and Figure 17 affords the same illustration when the parts are in position actually giving the wrong signal indication.

Figure 18 is a diagrammatic view partially in section and partially in elevation, illustrating the arrangement of the contact spring.

Figure 19 is a diagrammatic view of the contact plate and toe cam together with the electric connections for said parts, in wrong-turn indicating operation.

Figures 20 to 23 are detail views of the control arms employed in the present invention.

Figure 24 is a detail view of the shift pin and link arms.

It is notable that in the carrying out of the present invention it is contemplated, in one adaptation thereof, that the main control and actuating parts of the signaling mechanism shall and may be assembled in a hub unit structure for the steering wheel of the automobile or other conveyance employing an equivalent type steering mechanism. The parts of the invention have been specially designed so as to be accommodated in the space defined by any usual type of hub structure for common steering wheels in use. When such a unit is employed the circuit wires running to the various signal lights and audible signaling means are required to be threaded into and through the stationary tube of the steering column.

In another adaptation of the invention, if it be desired to avoid the carrying of the circuit wires up to the hub of the steering wheel, the main actuating and control instrumentalities may be assembled in a terminal box located beneath and attached to the gear housing at the lower end of the steering column, certain operating parts of course being carried at the top of the column and adjacent to the hub of the steering wheel for the operation of said main control and actuating instrumentalities proximate to the lower end of the steering column.

That construction of the invention first mentioned above is the adaptation which will now be generally set forth, referring primarily to Figures 1 to 5 inclusive. First referring to Figures 1 and 2, it will be noted that there is shown the relatively thick walled steering tube 1 which is tapered to receive the metal steering wheel hub 3. The hub 3 is fitted to the tube and fixed to turn therewith by the employment of one or more Woodruff keys inserted in suitable keyways in the parts 1 and 3. The hub 3 is attached to the tube 1 by the use of a lock nut 4 according to conventional practice, and above the nut 4 is located a cam ring 5 which is screwed upon the upper extremity of the tube 1 and fixed from rotation by means of a key 5a. In the periphery of the cam ring 5 there is provided a recess 5', seen best in Figures 14 and 15, and said recess is adapted to receive the free extremity or toe portion of a toe cam 30. Rotation of the steering wheel produces similar rotation of the cam ring 5 thereby causing movement of the toe cam 30 in one direction or the other, dependent upon the direction of movement of the steering wheel and its tube 1.

The movement of the toe cam 30 in the above manner is adapted to transmit rotational movement to a rock shaft 28, which rock shaft 28 carries connected thereto the automatic roller arm 33 having the fiber roller 35. The direction of rotation of the rock shaft 28 depends upon the direction of turning of the steering wheel, and the movement of the rock shaft from the steering wheel is in a direction opposite that of the steering wheel and its tube 1. The connections between the shaft 28 and the roller arm 33 will be later described.

Centrally disposed in the steering tube 1 is a non-rotative tube 6 which is fixed to a round metal cup 7 which is wholly surrounded by the hub 3 and contains the major moving parts of the control and operating features of the signaling mechanism.

Fitted to the open top portion of the metal cup or casing 7 is the depressible and rotatable knob 9 which, when depressed, operates the horn, and which knob may be rotated in either of opposite directions whereby to actuate certain manually controlled turn-signals, as will be more fully explained hereafter.

Encircling the casing 7 is the lever ring 8 that operates the headlight switch for the lighting system of the automobile and includes the parts 42, 43, same being electric contacts. Similar such parts as 42, 43, not shown, are employed for the headlight dimmer switch means, and are conventional.

The headlight lever ring 8 is operated by the usual actuating arm or lever 8', see Figure 2, to rotate the ring 8 for causing cooperation or separation of the contact members 42 and 43.

Intermediate the lever ring 8 and the manual control knob 9 is provided a retaining ring 10 the upper end of which is flanged inwardly so as to overlie the rim of the manual control knob 9 and thus prevent displacement of the latter. The lever ring 8 is formed with an inwardly projecting shoulder 8a which extends beneath the lower end of the retaining ring 10 thus holding the lever ring 8 from displacement. The ring 10 screws onto the upper end of the casing 7.

Screwed upon the end of the fixed tube 6 and bearing against the metal casing 7 attached to said tube is a nut 11 having deep notches or serrated portions at its top to provide openings or passages through which to permit wires of the electric circuit system to pass from the tube 6 into the space encompassed by the casing 7. From the top of the nut 11 and extending upwardly is a tubular shaft member 12 having a key slot 68 in a side thereof, said slot extending from the lower fiber disc or floor plate 29 nearly to the underside of the knob 9. Adjacent disc 29 on the shaft member 12 is a thin metal washer 12a. Above the washer 12a is mounted the manually controlled roller arm 34 and above this is a thin spacing washer 12b. Above the washer 12b is mounted the automatic roller arm 33 and above it is another washer 12c. Above the washer 12c is mounted a second manually operated roller arm 32, and another spacer washer 12d is located above the last mentioned arm. Above the washer 12d is mounted the fiber disc or top plate 26.

On top of the disc 26 is located a lock nut 13 which is encircled by a fiber ring 14 that carries the double winged plate 22 of the wrong turn warning signal assembly, see Figure 19. The fiber ring 14 has a key entering a notch in the lock nut 13 so that these parts will rotate together. The shaft member 12 extends above the lock nut 13 sufficiently far to receive and fixedly hold a small metal disc 15 having two upturned lugs or fingers 17 which extend into recesses in the depressible and rotatable manual knob 9. Directly above the disc 15 and closely contacting it as well as the top of the shaft member 12 is a very shallow pan-shaped washer 16, the outer rim of which is contacted by the flanged inverted cup-shaped contact plate 21 when the knob 9 is depressed sufficiently for such purpose. In this manner the depression of the knob 9 and contacts established complete the horn signal circuit of the signaling system; the wire from the horn signal terminal designated 09 in Figure 5 is brought up from the terminal board through the center tube 6 and passes into the shaft member 12 and terminates in a rivet-shaped metal button 20. The button 20 is insulated from the top of the shaft member 12 by a split fiber insulation 16'. Overlying and riding the metal button 20 is a metal disc 20' having a peripheral flange and forming a spring seat for the compression spring 19. The spring seat 20' is insulated from the pan-shaped washer 16 by the insulating washer 16''.

The fiber discs 26 and 29 that enclose the roller space in which the rollers of the manual and automatic roller arms operate carry the contact springs 36 and 41, and 38 and 39, which project through openings in the discs into the roller space (see Figure 18). The discs 26 and 29 also carry the flasher and caution signal contact plates 37 and 40, the lower disc 29 carrying the caution signal plate 40 in addition to the contact springs 41 and 39 that are electrically connected to the steady burning caution signal lights that operate from the right and left sides of the car, for the left and right turns respectively.

It might be noted here that it is contemplated according to the lighting system used for my invention that there shall be located on each side of the automobile a steady burning caution light and there shall also be located at each side of the automobile a flasher turn signal light, as will be seen on reference to the diagram of circuits in Figure 3. It is also contemplated that when the vehicle is about to make a turn, the flasher light shall indicate the direction of turn at the side of the vehicle toward which the turn is made, both in front and in the rear of the vehicle; also, when the said flasher lights are flashing at said side, the steady burning caution lights at the opposite side will be operated. Under these conditions the signal lights will be effective both as viewed from the front and rear of the vehicle, as well as the sides.

It may also be stated that it is contemplated according to the invention that when the turn signal light or lights are flashed, an audible signal will simultaneously sound for an audible warning. Likewise, if the operator of the vehicle pre-sets his manually controlled signaling means to indicate a turn to the left and thereafter changes his mind and completes a turn to the right, or vice versa, then an audible signal, which is called herein the wrong-turn signal, will sound with a special squawking or loud noisy sound distinctive from the ordinary audible signal for the usual turns pre-set and completed, thereby to warn passers-by, pedestrians, oncoming and following vehicle drivers that the driver is making a turn in a direction different from the one as to which warning has been given by the pre-setting manual means.

The upper disc 26 also carries the wrong-turn warning signal electrical connection plate 23, see Figures 1, 2, and 9, with its upstanding contact blade or lug 23′, and the parts 42 and 43 of the headlight switch, also the parts similar to 42 and 43, not shown, for the dimmer switch.

The rock shaft 28, positioned between the shaft member 12 and the wall of the casing 7 on the side opposite to but aligned with the center-line of the automatic roller arm 33, extends upward from a point below the bottom of the casing 7 to a point above the top of the disc 26, and is equipped with link arms 71 and 71′ and a shift pin 31, all located in the roller arm space. Fastened by any suitable means at the upper end of the shaft 28 is the wrong-turn signal toe cam 24 which provides the electrical ground to complete the wrong turn signal circuit.

*Automatic signaling operation*

The automatic signaling operation for a right turn of the vehicle will be now described. The steering wheel is turned clockwise in the usual manner, and its motion is transmitted to the cam ring 5 through the hub 3 and the steering tube 1. The motion produced by the cam ring is transmitted to the rock shaft 28 by the toe cam 30 and cam recess 5′, but the motion transmitted is from clockwise direction of the tube 1 to counter-clockwise direction of the shaft 28. The movement is communicated in this manner to the roller 35 of the automatic roller arm 33 by the shifting of the links 70 and 70′ which connect the arms 71′ and 71 respectively, see Figures 10 to 13 inclusive. The links 70 and 70′ are pivoted to the arms 71′ and 71 respectively, and also pivoted to the automatic signal control arm 33 at the points 72 and 72′ respectively. The connections 72 and 72′ are directly with the hub portion of the arm 33.

Under the above conditions, the automatic roller arm 33 is moved to the right as seen in Figure 12, carrying its roller 35 to a position actuating the springs 38 and 39 to carry these springs into contact with the flasher contact plate 37 and the caution contact plate 40, thereby lighting the flasher light on the right side of the machine and the steady burning caution light on the left side of the automobile or vehicle by completing the electric circuits for these lights, which circuits are shown in Figure 3.

If the direction of the turn of the steering wheel is reversed, or counter-clockwise, to bring it back to its normal straight ahead driving position, the movement of the arm 33 and its roller 35 are reversed to release the pressure on the roller 35 from the springs 38 and 39, thereby opening the flasher and caution signal circuits preparatory to another turn.

Similar procedure is followed in operating the automatic signaling mechanism for a left turn, except that the initial steering wheel turning movement is counter-clockwise, thereby communicating a clock-wise movement to the rock shaft 28 to rotate the roller arm 33 counter-clockwise, as seen in Figure 13 of the drawings, thereby to establish the flasher and steady burning caution circuits by causing the roller to engage the contact springs 36 and 41 to move these springs into contact with the flasher and caution contact plates 37 and 40, respectively.

In the event that a turn of the vehicle is started in one direction by manipulation of the steering wheel so that the signals are functioning, if the driver changes his mind and completes a turn in the opposite direction, the signal mechanism will automatically shift from the first turn started to the second or completed turn.

*Manual signaling operation*

The operation of the manually controlled features of the turn signal mechanism of the invention is accomplished in the following way, using the right turn in illustrating the example.

Referring to Figures 1 and 2, there will be seen the sunken depressible and rotatable manual control knob 9, previously mentioned. This knob 9, as pointed out before, is interlocked, by the projection 17 engaging in the recesses of the knob 9, with the member 15 fixed to the shaft member 12. Mounted on the shaft member 12 are the upper and lower manual control arms 32 and 34 which turn with the shaft and with the knob 9. The manual control arms are seen well in Figures 10 to 13 and comprise hub portions 32a and 34a. The hub portions 32a and 34a are similar to the hub portion of the arm 33 but are operated by the shaft 12 to which they are keyed, as stated above. The hubs 32a and 34a are equipped with cam arms 73 and 73′, respectively, which are normally spaced apart and between which is adapted to operate the shift pin 31 previously described. If the control knob 9 be rotated to the right or clockwise, the roller 34′ of the arm 34 is moved to position to press the flasher and caution signal springs 38 and 39 into contact with their respective plates 37 and 40, completing the flashing and caution circuits. Reversing this movement will enable the breaking of the circuits as when the arms 32 and 34 are in their neutral or inoperative position.

The left turn signal means is operated manually in an obviously similar manner, except that the knob 9 is turned to the left and the roller 32' is caused to operate the contacts 36 and 41 to thereby engage these contacts with the flasher plate 37 and caution contact plate 40, respectively.

*Locking and automatic re-set mechanism*

It is contemplated by the instrumentalities of this invention that it shall not be possible for the driver of a conveyance equipped with the invention to set or operate the manual signaling control means when the automatic signal control means is effective for signaling action. In other words, supposing the automobile equipped with the invention is making a right turn. Under these conditions, it is desirable, of course, and necessary, that the operator shall not be able to move the manual knob 9 so as to signal for a left turn, and vice versa.

The parts which control the above feature of operation of the mechanism are best seen in Figures 10 to 13 and involve the use primarily of the shift fingers 73 and 73' which are carried by the manual control arms 32 and 34, respectively. Illustrating the action of these parts in one exemplification of operation, it is noted upon reference to Figure 12 that the automatic control arm 33 is operated to effect signaling for a right turn, working in conjunction with the contacts 38, 39, and the contact plates 37, 40. While the arm 33 is so operated, it will be seen from Figure 12 that the automatic shift pin 31 is positioned in virtual impingement against the shift finger 73 of the left turn manual control arm 32. Therefore, under the condition of the right turn operation of the signaling means as shown in Figure 12 it will be seen that it is impossible for the operator of the vehicle to move the manual knob 9 and shift the control arm 32 into working cooperation with the contacts 36 and 41. In this way the driver of the vehicle or conveyance is prevented from signaling a left turn by the manual control means when the right turn signaling means is operated through the clockwise movement of the steering wheel as the vehicle actually makes the right turn. Of course, in like manner the shift pin 31 can cooperate with the shift finger 73' to prevent a manual right turn signal action being effected when the steering wheel is turned as a left turn is being made. The arrangement of parts for such locking cooperation is according to the positions in Figure 13.

Now it is desirable, as previously suggested, for the control mechanism to be operable so as to re-set or restore the manual signal control means to a normal or neutral position when the automatic means goes into action, and at the same time maintain the continuity of the signaling operation for the particular direction originally indicated by the manual means. Thus, as an example, assuming that the automobile is approaching a corner where a right turn is to be made, the operator by the use of the invention may operate the knob 9 and pre-set the flasher and steady burning caution signal lights for the right turn to be made. The positions of the parts of the manual and automatic control arms and rollers for such right turn is shown in Figure 11. When the automobile reaches the corner and the steering wheel is operated to make the turn to the right, the automatic control arm, by means of a lug 74 on its right edge, is shifted to the right as seen in Figure 12, and the lug 74 is caused to engage the manual control arm 34 previously set for signaling the right turn and moves the arm 34 to shift its roller 34' away from the spring contacts 38 and 39 while the roller 35 of the automatic control arm 33 moves into engagement with the said spring contacts 38 and 39. It will thus be seen that the manual signaling means for the right turn is incapacitated simultaneously with the action of the automatic signaling means to continue the right turn signaling devices in operation. In other words, the foregoing action involves the setting of the manual signaling arm 34 to its normal or neutral position simultaneously with the assumption by the automatic control arm 33 and its roller 35 of the function of the parts 34 and 34' to thus continue the right turn signaling action.

The above operation of resetting or normalizing the arm 34 is the same, practically speaking, for the arm 32 except that another projection 74' on the left edge of the arm 33 coacts with the arm 32. Of course the coaction between the parts 33 and 32 by the projection 74' takes place for resetting the manually pre-set signal for left turn when the automatic signaling means is put into operation as the left turn is made.

*Wrong turn signal control means*

Bearing in mind that the manually controlled signal begins to operate to indicate the direction of proposed turn as soon as it is pre-set, the wrong turn signal mechanism is designed for use under conditions when the manually controlled signal has been pre-set for a turn and the operator of the signaling car makes a turn different from that of the manually preset signals. It is desired under the above circumstances that the mechanism shall sound what is called the wrong-turn signal to warn the car operator himself in time to correct the direction of the car so as to avoid collision with the following or oncoming cars or to avoid running down pedestrians.

The above desired action is accomplished automatically in the following manner:

With the signal manually pre-set for and operating to indicate the right turn, as seen in Figure 11, the double winged plate 22 (fixedly attached to the fiber ring 14 keyed to the shaft member 12 lock nut 13) is rotated clockwise until the wing 22", see Figure 9, lies against the edge of the upturned contact lug 23' of the plate 23. Electrical contact is thus established between the face of the lug 23' and the arcuate surface portion 22a of the double wing plate 22, being that portion of the plate 22 face adjacent to the straight portion, the wings 22' and 22" not being relied upon for electrical contact purposes when brought against the edge of the upstanding lug 23'. Thus far the action has been initiated by the manually controlled portion of the device. Now if the turn is made in strict accordance with the signals as pre-set manually, the automatic means of the device acts to turn the rock shaft 28 counterclockwise and moves the toe of the toe cam 24 away from the wing 22", the automatic roller 35 thrusting the manual operating roller 34 out of engagement and restoring the wrong turn signal wing plate 22 and ring 14 to normal driving position without having sounded the wrong turn warning signal.

But, if the turn is actually made opposite to the direction indicated by the turn signal as pre-set, the rock shaft 28 is rotated clockwise bringing the toe of the toe cam 24 into electrical contact with the wing 22", completing the circuit from the battery, to the signal, to the plate 23, to the upstanding lug 23', to the arcuate portion of the face of the plate 22, to the wing 22", to the ground return, through the toe cam 24, causing operation of the wrong-turn signal. The flattened face of the plate 22 and the position of the wings 22' and 22", as related to the grounded toe cam 24, ensures the double break in the wrong turn warning signal circuit necessary for the successful opeation of this mechanism.

Figures 9, 16, 17, and 19 illustrate the action sequence of a pre-set signal for a left turn, showing the closing of a circuit with the sounding of a warning signal on account of the fact that the driver made a right turn contrary to the signal shown.

In Figure 19 the circuit arrangement is shown to include a special horn or audible signal of some kind, see also Figure 3, designated 24a, which is the wrong turn signal horn having characteristics of audibility distinctive entirely from any other signals used for the purposes of the invention. On this account, as when the signal 24a gives a loud squawking noise, it will afford a special warning of the wrong turn signal situation to the driver of the automobile equipped with the invention, to pedestrians, and to approaching and following vehicle drivers.

Headlight switch

The headlight switch means comprises the contact plates 42 and 43 in the upper chamber of the casing 7 and is shown in Figure 2. This headlight switch is the bright headlight switch, as distinguished from the dimmer switch which comprises similar parts at the opposite side of the casing 7 and which are not shown. The contact plate 42 is fastened to the fiber disc 26, see Figure 1, adjacent to the wall of the casing 7. To said wall of the casing 7 is fixedly attached the grounded contact spring 43. In operating the switch the wing lever 8' is partially rotated clockwise. Such movement of the lever 8' rotates the ring 8, causing the contact spring 43 to ride the ramp 43a, formed in the lever ring, until it makes electrical contact with the plate 42. Notches 44 and 45 are provided at the opposite end portions of the ramp 43a into which the bent portion of the contact spring 42 enters to hold the switch 8 in its on and off positions. The action of the dimmer switch contact members, not shown, is identical with the foregoing except that they go into operation at a counter-clockwise movement of the ring 8 by the member 8'.

Electric circuit arrangements

In the diagram of circuits shown in Figure 3, the current flows from the battery B through conductor IX to the main light control switch M which is part of the regular equipment of an automobile. From switch M current flows through main conductor 7X to the various electrical appliances used in connection with the operation of the car. From conductor 7X a branch 2X is run direct to the car headlights, supplying current to both of the high power lamps H and to both of the low power lamps L. From the other terminal of each high power headlight lamp the current passes through a short conductor to conductor 3X thence through the headlight switch-plate 42 to the grounded contact spring 43 completing the circuit. From the other terminal of each low power headlight lamp the current passes through a short conductor to conductor 4X thence to the headlight dimmer switch-plate 43b, see Figure 3, to the grounded contact plate 43b' completing the circuit.

From the main conductor 7X a branch conductor 5X furnishes current to the horn HN. From the other terminal of the horn HN a conductor 6X passes the current to the horn-button spring-plate 20', the current passing through the spring 19, (see Figure 1), which, when the control knob 9 is depressed, contacts with the flanged rim of the grounded disc 16 completing the circuit.

From the main conductor 7X a secondary main conductor 16X brances off supplying current to conductor 8X which is connected to the wrong turn signal W. From the other terminal of the wrong turn signal W current is conducted to the upstanding contact lug 23' by means of conductor 9X. From the contact lug 23', (see also Figure 9), the current passes to contact plate 22 thence to wing 22', or 22" to the toe cam 24 and to the ground when the respective manual control has been pre-set and a turn opposite to said pre-setting is made, as more specifically referred to hereinbefore.

From the main conductor 7X a secondary main conductor 10X leads to the thermal flashing switch T which is connected by means of conductor 11X to the flasher contact plate 37.

When a left turn is made the current passes from the contact plate 37 to contact spring 36, thence through conductors 12X and 13X to the grounded flashing signals F at the front and rear of the left side of the car.

The caution signals for the left turn are operated by current from main conductor 7X through conductor 16X to the caution signal contact plate 40, thence through contact spring 41, conductors 17X and 18X to the grounded caution signals C on the right side of the vehicle.

Likewise, to effect the right turn signaling, current flows from the flasher contact-plate 37, through contact spring 38, conductors 14X and 15X to the grounded flashing signals F on the right side of the car while the simultaneously operated steady burning right turn caution signals C on the left side of the car receive their current supply from contact plate 40, the current passing through contact spring 39, conductors 19X and 20X to the right turn steady burning caution signals and thence to the ground.

The audible signal S1 is connected to the left turn caution signal circuit on the right side of the car by means of conductors 21X and 18X. From the other terminal of the audible signal S1 conductor 22X completes the circuit through the grounded thermal switch TS. The audible signal S1 gives a single audible stroke indicating to pedestrians and others that a left turn is being made. Likewise the audible signal S2 is operated when the circuit composed of conductor 20X, 23X, and the grounded thermal switch TS is completed upon operation of the signaling circuit for the right turn indication. The audible signal 2S is a two stroke signal audibly indicating the right turn.

On the instrument panel of the automobile, visibly indicating to the operator the actual performance of the various signaling circuits, are tell-tale signal lamps in miniature, that operate in perfect synchronism with the turn signals, one for each signal indication. Tell-tale signal 24X' indicates the performance of the flashing signals for the right turn, tell-tale signal 25X' indicates the corresponding caution signal for the right turn; while tell-tale signals 26X' and 27X' perform similar duties for the left turn flashing and caution signals.

When the car is in operation and a right turn is made, the right turn flashing and caution signal circuits are energized, current flows from the right turn flashing signal control conductor 14X to the tell-tale control conductor 24X, thence to the grounded right turn flashing telltale signal 24X'; simultaneously the steady burning caution signal control conductor 19X is energized, current flows from conductor 19X to the tell-tale control conductor 25X, thence to the grounded right turn caution tell-tale signal 25X' and completing the circuit.

When a left turn is made, the left turn flashing and caution signal circuits are energized, current flows from the left turn flashing signal control conductor 12X to the left turn tell-tale control conductor 26X, thence to the grounded left turn flashing tell-tale signal 26X'; simultaneously the left turn caution tell-tale signal 27X' receives current from the left turn caution signal control conductor 17X through the caution tell-tale signal control conductor 27X, the circuit being completed through the grounded tell-tale signal lamp.

In the above reference has been made to steady burning signal lights, and to flashing signal lights, and it has, of course, been understood that the steady burning signals as well as the flashing turn signals are only in operation when their respective circuits have been energized for purposes of signaling indications.

In the modification of my invention illustrated in Figures 6, 7, and 8, it is contemplated that the knob 9 shall be connected to turn the tubular shaft 12c, (see Figure 6), corresponding with the shaft 12 previously described and shown in Figure 1, except that the shaft 12c leads from the top of the steering column, or hub, of the steering wheel, down through the bottom of the gear casing 100 which houses the gearing at the lower end of the steering column. The shaft 12c is connected with control instrumentalities comprising control arms like arms 32, 33, and 34, previously described and shown in Figures 1, 10, and others. The terminal board and other parts employed for the operating and control features will be substantially the same as those previously described, and so far as illustrated, are given the same reference numbers.

In the modified construction just referred to, however, it is understood that it is not necessary to run the wires of the electrical circuits, which are required for the operation of the automatic and manual control arms, up to the hub of the steering wheel, since, according to this adaptation of the invention, the automatic and manual control arms together with their electrical contact making means and connections are assembled in the removable housing 101, (see Figure 6), at the lower end of the gear housing of the steering column. The arrangement of the terminals used in the modified construction shown in Figure 6, is shown in Figure 7, and the electric wiring diagram of Figure 8 depicts the various circuits, signals, signaling means and connections used in the modified structure.

*Electrical circuit arrangements of the modified structure*

Referring now to the electric circuit arrangements of the modified construction herein referred to, and illustrated in Figure 8, it will be seen that current flows from the battery B to and through the main light switch M by means of main conductor 1Y. From this main conductor 1Y a branch conductor 2Y supplies current to the horn HN. The other terminal of the horn HN is conductively connected by means of conductor 5Y to the horn button-plate 21 cooperating with the grounded contact plate 16.

From the main conductor 1Y a secondary main conductor 8Y supplies current to the caution signal plate 40.

A conductor 6Y leads from the secondary main 2Y to one terminal of the wrong turn signal W, the other terminal being connected to the grounded toe cam 24 by means of conductor 7Y, the upstanding wrong turn signal contact lug 23', plate 22 and wing contact 22', or 22'', the latter contact depending upon the contact position of the toe cam 24, as specifically referred to and described hereinbefore.

From the main conductor 1Y, another secondary main conductor 9Y supplies current to the flasher T. From the other terminal of flasher T current flows over secondary main conductor 10Y to the flasher contact-plate 37.

When a left turn is made, current flows from the flasher contact-plate 37 to contact spring 36, thence over conductors 11Y and 12Y to the grounded flashing signals F on the left side of the car; simultaneously current passes from the caution signal contact-plate 40 to contact spring 41 thence over conductors 14Y and 15Y to the grounded steady burning caution signals C located on the right side of the car.

When a right turn is made, current flows from the flasher contact-plate 37 to contact spring 38 thence by conductor 16Y and conductor 17Y to the grounded flashing signals F on the right side of the car; simultaneously current flows from the caution signal contact-plate 40 to contact spring 39 thence by means of conductors 18Y and 19Y to the grounded steady burning caution signals C on the left side of the car.

On the instrument panel of the automobile, visibly indicating to the operator the actual performance of the various signaling circuits, are tell-tale signals that operate in perfect synchronism with the turn signals. Tell-tale signal 22Y' indicates the performance of the flashing signal for the right turn; tell-tale signal 23Y' indicates the performance of the steady burning caution signal for the right turn, while tell-tale signals 20Y' and 21Y' perform similar duties for the left turn flashing and caution signals respectively.

When the car is in operation and a right turn is made, current flows from the right turn flashing signal conductor 16Y to conductor 22Y thence to the grounded right turn flashing tell-tale signal 22Y'; simultaneously the steady burning caution tell-tale signal 23Y' receives current from the right turn caution signal conductor 18Y and tell-tale conductor 23Y, the circuit being completed through the grounded tell-tale signal.

When a left turn is made, current flows from the left turn flashing signal conductor 11Y to tell-tale conductor 20Y thence to the grounded left turn flashing tell-tale signal 20Y'; simultaneously the steady burning caution tell-tale signal 21Y' receives current from the left turn caution signal conductor 14Y and tell-tale conductor 21Y, the circuit being completed through the grounded tell-tale signal.

The audible signal S1 for the left turn is connected to the left turn caution signal conductor 15Y by means of conductor 24Y, while the other terminal of said signal is connected to the ground through line 25Y and the grounded slow operating thermal switch TS. In like manner signal S2 is connected to the right turn caution signal conductor 19Y by conductor 26Y and to the ground by means of conductor 27Y and the grounded thermal switch TS. These audible signals operate in the same manner as the audible signals referred to in Figure 3 and further description of the same is not deemed necessary.

The stationary tube 6 may be secured to the gear housing 110, (see Fig. 4), in any convenient manner, by means of a clamp 111 or by welding. This stationary tube serves as a ground connection for certain instrumentalities previously described, as will be obvious to those skilled in the art.

In the above, reference has been made to steady burning lights and flashing signal lights, and it has of course been understood that the steady burning signals as well as the flashing signal lights are only in operation when their respective circuits have been energized for purposes of signaling indications.

Having thus described my invention, what I claim as new and desire to secure by Letters Patent of the United States, is—

1. In vehicle signaling mechanism of the class described, in combination, visual turn signaling means, manual control means for said visual signaling means for pre-setting the same, cooperating automatic control means for said visual signaling means, steering wheel means by which the automatic control means is actuated, and audible signaling means operable simultaneously with the aforementioned visual signaling means, together with a separate distinctive sounding audible signaling means, and instrumentalities for causing the latter signaling means to operate responsive to actuation of the automatic control means to signal a turn different from that indicated by pre-set manual control means.

2. In vehicle signaling means of the class described, in combination, turn signaling means, control means for said turn signaling means including an electrical control circuit having contact means incorporated therein for making and breaking said circuit, said contact means comprising a pair of normally open contacts, one of which is movable towards and away from the other, a rock shaft positioned adjacent to said contact means, an actuator for said contact means, said actuator comprising a pivotal arm operatively connected with said rock shaft and including means engageable and disengageable with the movable contact aforesaid for closing and opening said contacts responsive to rocking of said rock shaft in opposite directions, steering means for said vehicle, means for operating said rock shaft responsive to said steering means, a second pivotal arm coaxial with the first and including additional contact engaging and disengaging means, and means for operating the latter to close and open the contacts independently of the steering means when the first pivotal arm is in a position establishing the normally open relation of the contacts.

3. In vehicle signaling means of the class described, in combination, turn signaling means, control means for said turn signaling means including an electrical control circuit having contact means incorporated therein for making and breaking said circuit, said contact means comprising a pair of normally open contacts, one of which is movable towards and away from the other, a rock shaft positioned adjacent to said contact means, an actuator for said contact means, said actuator comprising a pivotal arm operatively connected with said rock shaft and including means engageable and disengageable with the movable contact aforesaid for closing and opening said contacts responsive to rocking of said rock shaft in opposite directions, steering means for said vehicle, means for operating said rock shaft responsive to said steering means, a second pivotal arm coaxial with the first and including additional contact engaging and disengaging means, means for operating the latter to close and open the contacts independently of the steering means when the first pivotal arm is in a position establishing the normally open relation of the contacts, and means responsive to operation of the first pivotal arm when the first pivotal arm is operated to its contact closing position for automatically restoring the second pivotal arm to its open contact position after an operation of the latter to its contact closing position.

4. In vehicle signaling means of the class described, in combination, turn signaling means, control means for said turn signaling means including an electrical control circuit having contact means incorporated therein for making and breaking said circuit, said contact means comprising a pair of normally open contacts, one of which is movable towards and away from the other, a rock shaft positioned adjacent to said contact means, an actuator for said contact means, said actuator comprising a pivotal arm operatively connected with said rock shaft and including means engageable and disengageable with the movable contact aforesaid for closing and opening said contacts responsive to rocking of said rock shaft in opposite directions, steering means for said vehicle, means for operating said rock shaft responsive to said steering means, a second pivotal arm coaxial with the first and including additional contact engaging and disengaging means, means for operating the latter to close and open the contacts independently of the steering means when the first pivotal arm is in a position establishing the normally open relation of the contacts, and means responsive to operation of the first pivotal arm when the first pivotal arm is operated to its contact closing position for automatically restoring the second pivotal arm to its open contact position after an operation of the latter to its contact closing position, said last mentioned means comprising abutment means on one arm engageable with the other arm.

5. In vehicle signaling means of the class described, in combination, turn signaling means, control means for said turn signaling means including an electrical control circuit having contact means incorporated therein for making and breaking said circuit, said contact means comprising a pair of normally open contacts, one of which is movable towards and away from the other, a rock shaft positioned adjacent to said contact means, an actuator for said contact means, said actuator comprising a pivotal arm operatively connected with said rock shaft and including means engageable and disengageable with the movable contact aforesaid for closing and opening said contacts responsive to rocking of said rock shaft in opposite directions, steering means for said vehicle, means for operating said rock shaft responsive to said steering means, a second pivotal arm coaxial with the first and including additional contact engaging and disengaging means, means for operating the latter to close and open the contacts independently of the steering means when the first pivotal arm is in a position establishing the normally open relation of the contacts, and means for preventing operation of the second pivotal arm when the first arm is in contact closing position.

6. In vehicle signaling means of the class described, in combination, turn signaling means, control means for said turn signaling means including an electrical control circuit having contact means incorporated therein for making and breaking said circuit, said contact means comprising a pair of normally open contacts, one of which is movable towards and away from the other, a rock shaft positioned adjacent to said contact means, an actuator for said contact means, said actuator comprising a pivotal arm operatively connected with said rock shaft and including means engageable and disengageable with the movable contact aforesaid for closing and opening said contacts responsive to rocking of said rock shaft in opposite directions, steering means for said vehicle, means for operating said rock shaft responsive to said steering means, a second pivotal arm coaxial with the first and including additional contact engaging and disengaging means, means for operating the latter to close and open the contacts independently of the steering means when the first pivotal arm is in a position establishing the normally open relation of the contacts, and means for preventing operation of the second pivotal arm when the first arm is in contact closing position, said last named means comprising a shift finger on said arm, and a shift pin operatively connected to said rock shaft and disposed in the path of said shift finger.

7. In vehicle signaling means of the class described, in combination, turn signaling means, control means for said turn signaling means including an electrical control circuit having contact means incorporated therein for making and breaking said circuit, said contact means comprising a pair of normally open contacts, one of which is movable towards and away from the other, a rock shaft positioned adjacent to said contact means, an actuator for said contact means, said actuator comprising a pivotal arm operatively connected with said rock shaft and including means engageable and disengageable with the movable contact aforesaid for closing and opening said contacts responsive to rocking of said rock shaft in opposite directions, steering means for said vehicle, means for operating said rock shaft responsive to said steering means, separate manually operable means for selectively closing and opening the contacts independently of the steering means when the pivotal arm is in a position establishing the normally open relation of the contacts, whereby to preset the signaling means in advance of operation of the same by the steering means, and additional signaling means operable responsive to said steering means when the steering means is operated to actuate the turn signaling means contrary to a manually preset signal indication.

8. In vehicle signaling means of the class described, in combination, turn signaling means, control means for said turn signaling means including an electrical control circuit having contact means incorporated therein for making and breaking said circuit, said contact means comprising a pair of normally open contacts, one of which is movable towards and away from the other, a rock shaft positioned adjacent to said contact means, an actuator for said contact means, said actuator comprising a pivotal arm operatively connected with said rock shaft and including means engageable and disengageable with the movable contact aforesaid for closing and opening said contacts responsive to rocking of said rock shaft in opposite directions, steering means for said vehicle, means for operating said rock shaft responsive to said steering means, separate manually operable means for selectively closing and opening the contacts independent of the steering means when the pivotal arm is in a position establishing the normally open relation of the contacts, whereby to preset the signaling means in advance of operation of the same by the steering means, and additional signaling means operable responsive to said steering means when the steering means is operated to actuate the turn signaling means contrary to a manually pre-set signal indication, said additional signaling means including a stationary contact in the electrical control circuit, movable contact means engageable and disengageable with the stationary contact and operable by the manually operable means aforesaid, and another movable contact member in said electrical control circuit and engageable and disengageable with the last mentioned movable contact means when the latter is in engagement with the stationary contact, and operatively connected to said rock shaft so as to be actuated by the steering means.

HARRY M. FARRAND.